(12) United States Patent
Summerfield et al.

(10) Patent No.: US 8,568,207 B1
(45) Date of Patent: Oct. 29, 2013

(54) APPARATUS AND METHOD USING ELECTROMAGNETIC RADIATION FOR STUNNING ANIMALS TO BE SLAUGHTERED

(71) Applicant: Hormel Foods Corporation, Austin, TX (US)

(72) Inventors: John W. Summerfield, Austin, MN (US); Jerry E. Cannon, Austin, MN (US); Harold D. Kimrey, Knoxville, TN (US)

(73) Assignee: Hormel Foods Corporation, Austin, MN (US)

( * ) Notice: Subject to any disclaimer, the term of this patent is extended or adjusted under 35 U.S.C. 154(b) by 0 days.

(21) Appl. No.: 13/835,694

(22) Filed: Mar. 15, 2013

(51) Int. Cl.
*A22B 3/06* (2006.01)
(52) U.S. Cl.
USPC .......................................................... 452/58
(58) Field of Classification Search
USPC ...................................... 452/57–60
See application file for complete search history.

(56) References Cited

U.S. PATENT DOCUMENTS

| | | | |
|---|---|---|---|
| 3,973,290 A | 8/1976 | Schwartz | |
| 4,392,039 A | 7/1983 | Risman | |
| 5,334,084 A * | 8/1994 | O'Brien et al. | 452/157 |
| 6,912,434 B2 * | 6/2005 | van den Nieuwelaar et al. | 700/116 |
| 6,974,373 B2 * | 12/2005 | Kriesel | 452/157 |
| 7,039,220 B2 * | 5/2006 | Kriesel | 382/110 |
| 7,214,128 B2 * | 5/2007 | Kriesel | 452/157 |
| 7,399,220 B2 * | 7/2008 | Kriesel et al. | 452/157 |
| 7,588,486 B2 * | 9/2009 | Horst et al. | 452/58 |
| 7,744,449 B2 * | 6/2010 | van Esbroeck et al. | 452/58 |
| 7,841,928 B2 * | 11/2010 | Tseng et al. | 452/58 |
| 7,918,718 B2 * | 4/2011 | Christensen et al. | 452/157 |
| 8,070,565 B2 * | 12/2011 | Horst et al. | 452/86 |

FOREIGN PATENT DOCUMENTS

WO    WO 2011/137497 A1    11/2011

OTHER PUBLICATIONS

Guy, Arthur W. et al. "Effects of high-intensity microwave pulse exposure of rat brain" Bioelectromagnetics Research Laboratory, Department of Rehabilitation Medicine University of Washington School of Medicine, Seattle, Washington. 1982. American Geophysical Union. Paper No. ISO050. p. 169S-178S.

Merritt, J.H. et al. "Microwave Fixation of Brain Tissue as a Neurochemical Technique—A Review." Journal of Microwave Power. 1977 by IMPI, Edmonton, Canada. vol. 12, No. 2. p. 133-139.

Modak, Arvind T. et al. "Use of 300-MSEC Microwave Irradiation for Enzyme Inactivation: A Study of Effects of Sodium Pentobarbital on Acetylcholine Concentration in Mouse Brain Regions" The Journal of Pharmacology and Experimental Therapeutics. 1976 by The Williams & Wilkins Co. vol. 197, No. 2. p. 245-252.

Moroji T. et al. "Rapid Microwave Fixation of Rat Brain" Journal of Microwave Power. 1977 by IMPI, Edmonton, Canada. vol. 12, No. 4. p. 273-286.

(Continued)

*Primary Examiner* — Richard Price, Jr.
(74) *Attorney, Agent, or Firm* — IPLM Group, P.A.

(57) ABSTRACT

A method of stunning an animal for slaughter is provided. The method includes directing a first portion of electromagnetic radiation in a first side of the animals head and directing a second portion of the electromagnetic radiation in a second side of the animals head such that the first portion and second portion of the electromagnetic radiation achieve constructive interfere at a focal point within the animal's head.

18 Claims, 5 Drawing Sheets

(56) References Cited

OTHER PUBLICATIONS

Nordberg A. et al. "Biosynthesis of Acetylcholine in Different Brain Regions in vivo Following Alternative Methods of Sacrifice by Microwave Irradiation" Acta Physiologica Scandinavica. 1976. vol. 98, Issue 3. p. 307-317.

Phillips, Richard D. et al. "Field Measurements, Absorbed Dose, and Biologic Dosimetry of Microwaves." Biology Department Battelle, Pacific Northwest Laboratories, Richland, Washington. Annals New York Academy of Sciences: Exposure Arrangements. Date unknown. p. 499-509.

Stavinoha, W. B. et al. "Microwave Irradiation for Brain Enzyme Inactivation: Import of Power Distribution." Federation of American Societies for Experimental Biology, Abstracts of Papers. $63^{rd}$ Annual Meeting Dallas, Texas Apr. 1-10, 1979. 2 pages.

* cited by examiner

US 8,568,207 B1

APPARATUS AND METHOD USING ELECTROMAGNETIC RADIATION FOR STUNNING ANIMALS TO BE SLAUGHTERED

BACKGROUND

In preparing meat products for consumption, the animal supplying the meat products needs to be put down. This is typically done by first stunning the animal and then bleeding the animal out. Electrical and carbon dioxide stunning systems are the two main systems used today for stunning pigs. Both of these systems have their advantages and disadvantages when compared to one another. Electrical stunning is very quick if applied correctly. Regarding its use on pigs, it places the pigs into a state of unconsciousness. In particular, into a grand mal seizure. Moreover, depending on how the electrodes are placed, it can also put the pig into cardiac arrest. After electrical stunning has been applied to the pig, the pig can be bled out and very quickly rendered dead. The cost is comparatively low from a capital cost standpoint as well as on an ongoing cost basis when compared to carbon dioxide. The disadvantages with electrical stunning includes the pig needs to be restrained and electrical wands need to be placed within a very tight area tolerance for it to be effective. Also a great deal of "blood splash" is created in some of the parts of the muscles. This is a very common occurrence in pigs that have been electrically stunned. Blood splash is unsightly and is visibly unattractive in meat products. Moreover electrical stunning can result in the pigs breaking their backs which can make it difficult for further processing.

Carbon dioxide stunning can be an effective way to stun pigs. One of the major advantages with this type of stunning is that allows pigs to be stunned in groups as opposed to having to go through a single file restrainer system. Some of the disadvantages are, however, it takes longer for the animal to be stunned with CO2. Moreover the capital cost for carbon dioxide science very expensive. The ongoing cost of carbon dioxide and equipment repairs are also expensive.

For the reasons stated above and for other reasons stated below which will become apparent to those skilled in the art upon reading and understanding the present specification, there is a need in the art for a humane, efficient and cost effective method of stunning animals.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a method of stunning an animal for slaughter is provided. The method includes directing a first portion of electromagnetic radiation in a first side of the animals head and directing a second portion of the electromagnetic radiation in a second side of the animals head such that the first portion and second portion of the electromagnetic radiation achieve constructive interfere at a focal point within the animals head.

In another embodiment, an electromagnetic animal stunning system is provided. The system includes a radiation generator, a power splitter, a first waveguide, a second waveguide and a positioning member. The radiation generator is configured to generate electromagnetic radiation at a select frequency. The power splitter is configured and arranged to split the generated electromagnetic radiation from the radiation generator into a first portion of electromagnetic radiation and a second portion of electromagnetic radiation. The first waveguide is configured and arranged to direct the first portion of electromagnetic radiation to a focal point. The second waveguide is configured and arranged to direct the second portion of electromagnetic radiation to the focal point. The first portion of electromagnetic radiation and the second portion of electromagnetic radiation are configured to produce constructive interference at the focal point. The positioning member is configured and arranged to position and animal's head so that the focal point is within the animal's brain.

In yet another embodiment, a stunning station is provided. The stunning station includes a holding compartment, a first waveguide and a second waveguide. The holding compartment is configured and arranged to hold an animal to be slaughtered. The first waveguide is configured to direct a first portion of electromagnetic radiation to a first side of a head of the animal. The second waveguide is configured to direct a second portion of electromagnetic radiation to a second side of the head of the animal.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide an electromagnetic radiation system that eliminates or minimizes blood splash, achieves stunning in a very short time (less than one second), with capital costs and operating costs being much more in line with the cost of electrical stunning. In embodiments, electromagnetic radiation (in the radio frequency (RF) or Microwave spectrum) is split into two paths with a power splitter. The paths direct the electromagnetic radiation to come together forming constructive interference (electric and magnetic waves in same phase) at a focal point within the animal's brain. The animal's brain is heated at the focal point by the constructive interference of the electromagnetic radiation stunning the animal. The process is further beneficial because the heating area of the brain is localized so that the surrounding tissue is not harmed therein providing less waist of the product.

Figure 1:
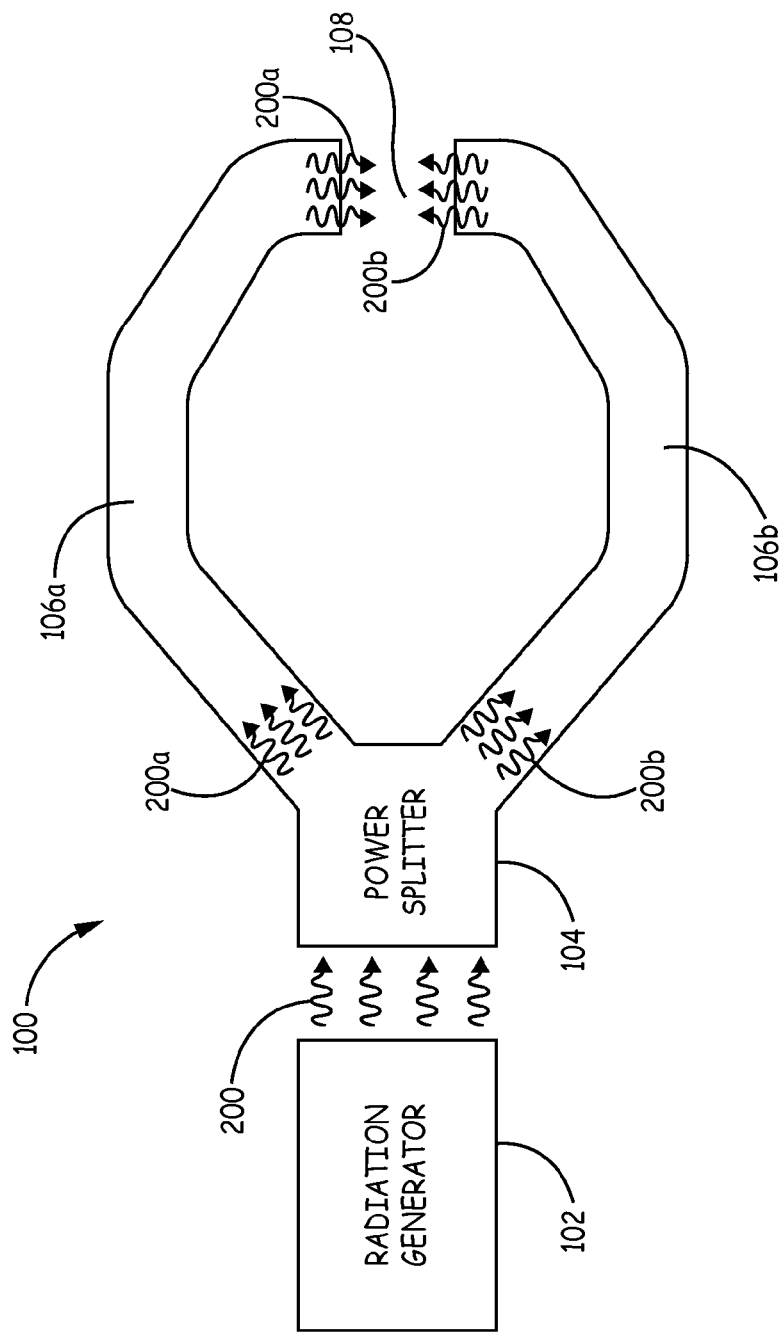
FIG. 1 is an illustration of an electromagnetic stunning system of one embodiment of the present invention.

Referring to FIG. 1, an illustration of an electromagnetic stunning system 100 of one embodiment is illustrated. As illustrated, the system 100 includes a radiation generator 102. The radiation generator in one embodiment generates electromagnetic radiation in the RF frequency range and in another embodiment generates electromagnetic radiation in the microwave range. The generated electromagnetic radiation 200 is directed to a power splitter 104. The power splitter 104 splits electromagnetic radiation into two paths. In particular, a first portion 200a of the electromagnetic radiation is split into a first waveguide 106a and a second portion 200b of the electromagnetic radiation is split into a second waveguide 106b. The first portion 200a and the second portion 200b will be "in phase." The respective first and second waveguides 106a and 106b direct their respective first and second electromagnetic radiation portions 202a and 202b to paths that converge. Since the first portion 200a and the second portion 200b of the electromagnetic radiation are in phase, constructive interference will occur at their convergence point (focal point 108). Hence, at the focal point 108, the magnitude of the first and second portions of the electromagnetic radiation 200a and 200b is the sum of the individual magnitudes of the first and second portions of electromagnetic radiation 200a and 200b. The animal to be stunned is positioned so the focal point 108 is within the animal's brain at a select location. At the focal point 108, the animal's brain will heat up therein stunning the animal. The desired temperature increase for stunning would be approximately 10-15° F. Hence, a pigs temperature prior to stunning is about 101-103° F., an increase of 15° F. would raise the temperature to 116-118° F. at the select location to accomplish stunning.

Figure 2:
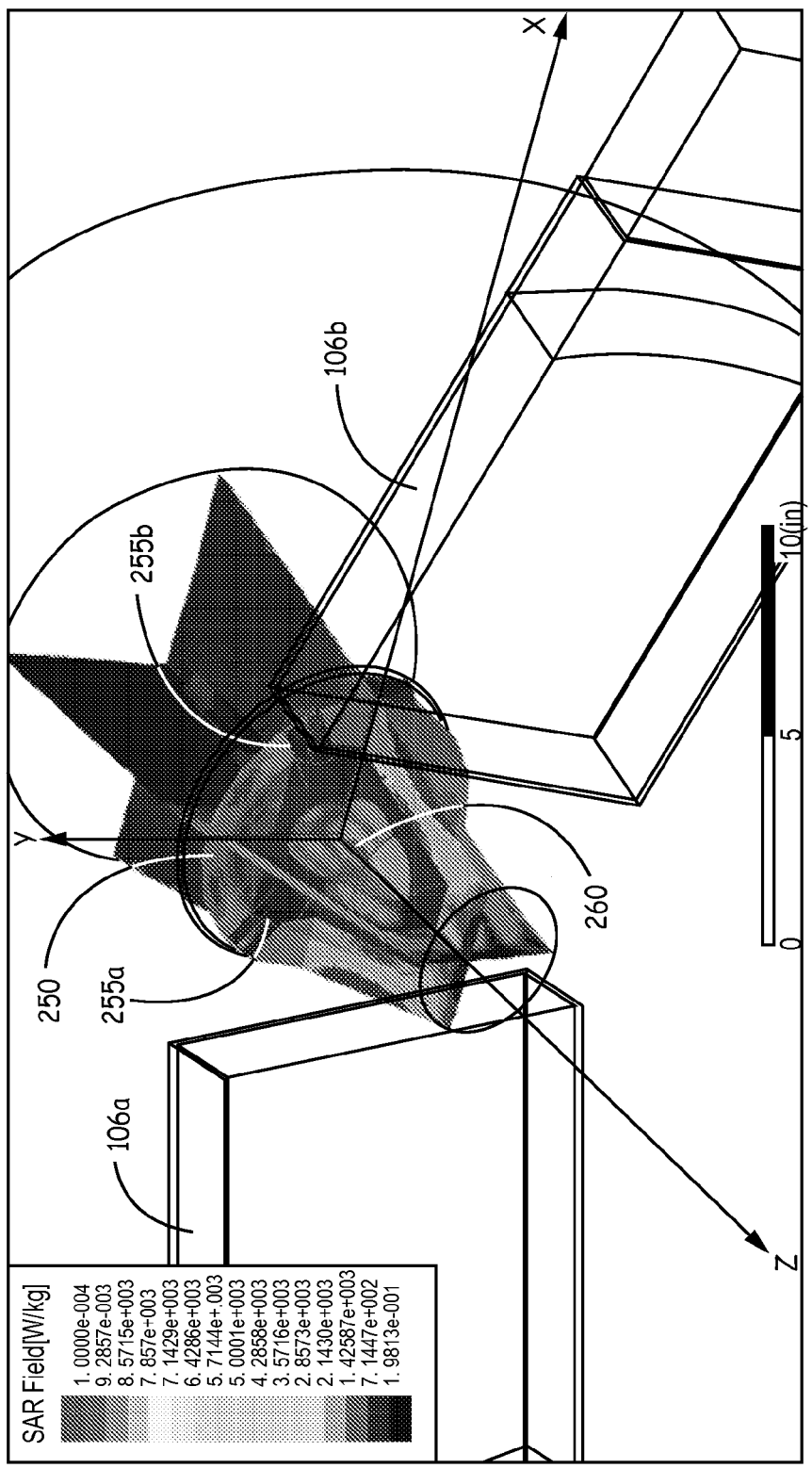
FIG. 2 is an illustration of the electromagnetic stunning system of FIG. 1 in use.

FIG. 2 provides an illustration of an animal head 250 that is positioned between the waveguides 106a and 106b. Illustration includes ears 255a and 255b. As discussed above the waveguides 106a and 106b direct their respective first and second portions of the electromagnetic radiation 202a and 202b to converge at a focal point 260. At this focal point 260, constructive interference of the radiation 202a and 202b signals takes place heating up the tissue. In one embodiment, the waveguides 106 and 106 direct their respective first and second portions of electromagnetic radiation 202 and 202 to the focal point 260 which is located at the brain stem of the animal.

Figure 3:
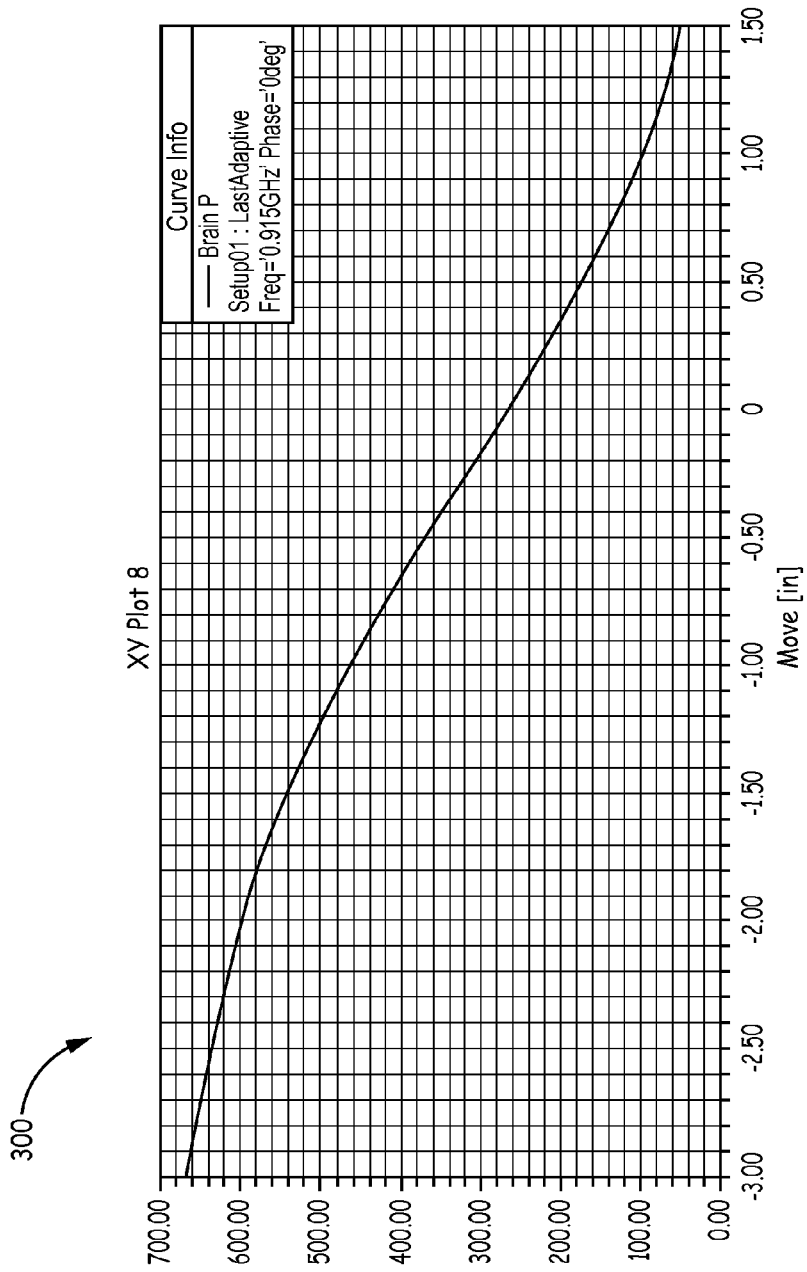
FIG. 3 is a power to brain as a function of axial position around are graph.
Figure 4:
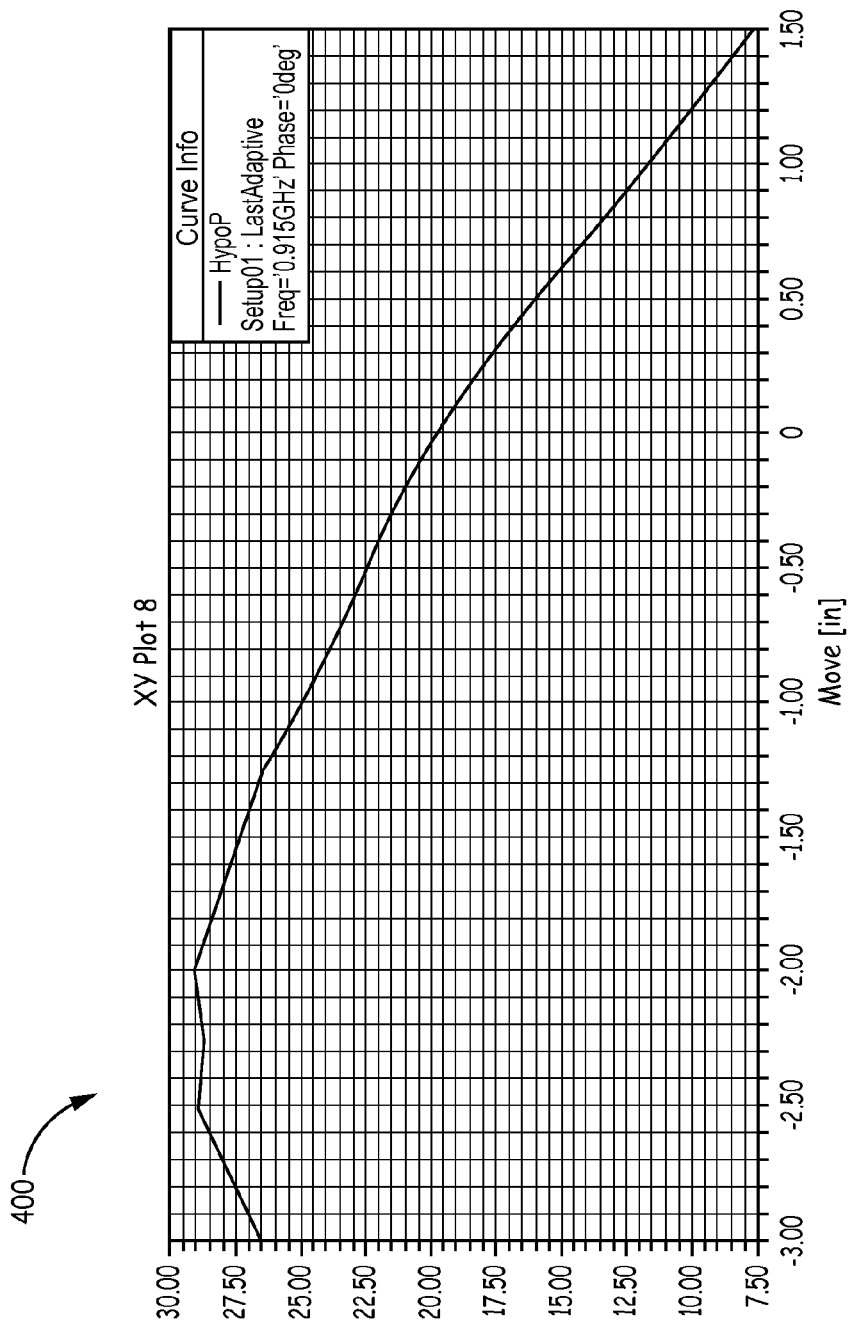
FIG. 4 is a power to hypothalamus as a function of axial position around ear.

FIG. 3 illustrates the total power to the brain as a function of axial position around ear represented XY graph 300. This graph 300 illustrates that by adjusting the axial location of the animal head relative to waveguides 106a and 106b, the total power to the brain can be maximized. FIG. 4 illustrates a power to the Hypothalamus part of the brain as a function of axial position around ear XY graph 400. The graph 400 illustrates the optimum location of the head relative to waveguides 106a and 106b to maximize power absorbed by the hypothalamus.

Figure 5:
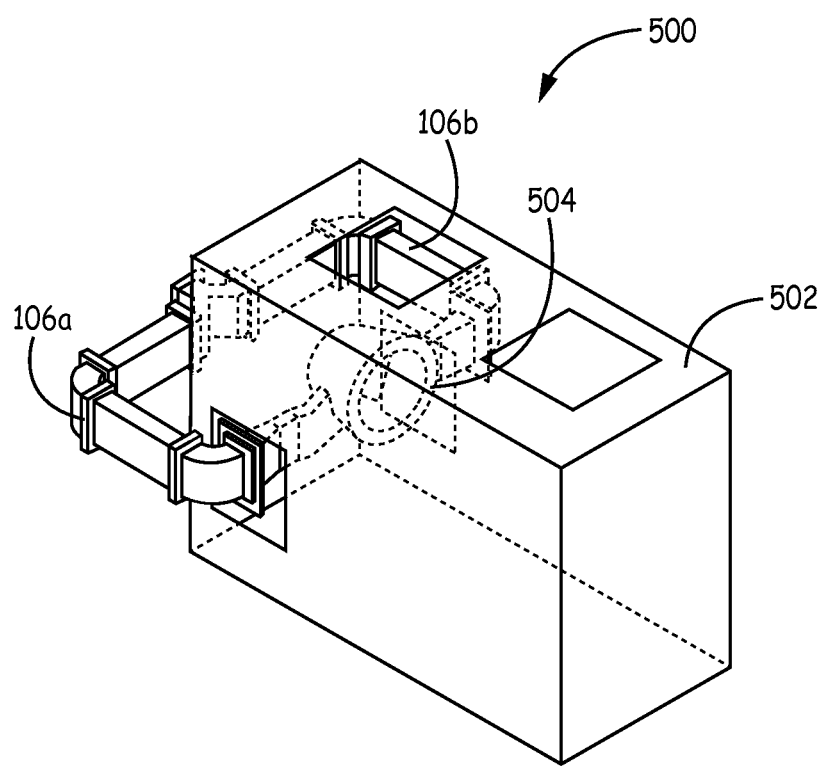
FIG. 5 is a stunning station that implements the electromagnetic stunning system of FIG. 1 of an embodiment of the present invention.

Referring to FIG. 5A stunning station 500 of one embodiment is illustrated. As illustrated, the stunning station includes a holding compartment 502 in which an animal would be restrained. The stunning station 500 includes a positioning portion 504 that is designed to position the animal head in a location in relation to the waveguides 106a and 106b. The positioning portion in one embodiment, also acts as a shield to localize the electromagnetic radiation. As discussed above, the waveguides 106a and 106b deliver electromagnetic radiation that creates constructive interference at a focal point that is within the positioning portion 504. The waveguides 106a and 106b would be coupled to receive electromagnetic radiation 200a and 200b from a power slitter 104 that splits electromagnetic radiation 200 from an electromagnetic generator 102.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of stunning an animal for slaughter, the method comprising:
    directing a first portion of electromagnetic radiation in a first side of the animals head; and
    directing a second portion of the electromagnetic radiation in a second side of the animals head such that the first portion and second portion of the electromagnetic radiation achieve constructive interference at a focal point within the animals head.

2. The method of claim 1, further comprising:
    splitting generated electromagnetic radiation into the first and second portions of electromagnetic radiation with a power splitter.

3. The method of claim 1, further comprising:
    heating a portion of the animals brain located at the focal point by 10-15° F.

4. The method of claim 1, further comprising:
    heating a brain stem of the animal at the focal point.

5. The method of claim 1, further comprising:
    using a first waveguide to direct the first portion of electromagnetic radiation to the first side of the animals head; and
    using a second waveguide to direct the second portion of electromagnetic radiation to the second side of the animals head.

6. The method of claim 1, further comprising:
    positioning the animals head in relation to the first and second portions of the electromagnetic radiation.

7. The method of claim 1, wherein directing a first portion of electromagnetic radiation in a first side of the animals head and directing a second portion of electromagnetic radiation into the second side of the animals head further comprises:
    directing a first portion of radio frequency electromagnetic radiation in a first side of the animals head; and
    directing a second portion of radio frequency electromagnetic radiation in a second side of the animals head.

8. The method of claim 1, wherein directing a first portion of electromagnetic radiation in a first side of the animals head and directing a second portion of electromagnetic radiation into the second side of the animals head further comprises:
    directing a first portion of microwave frequency electromagnetic radiation in a first side of the animals head; and
    directing a second portion of microwave frequency electromagnetic radiation in a second side of the animals head.

9. An electromagnetic animal stunning system, the system comprising:
    a radiation generator configured to generate electromagnetic radiation at a select frequency;

a power splitter configured and arranged to split the generated electromagnetic radiation from the radiation generator into a first portion of electromagnetic radiation and a second portion of electromagnetic radiation;

a first waveguide configured and arranged to direct the first portion of electromagnetic radiation to a focal point;

a second waveguide configured and arranged to direct the second portion of electromagnetic radiation to the focal point, the first portion of electromagnetic radiation and the second portion of electromagnetic radiation configured to produce constructive interference at the focal point; and a positioning member configured and arranged to position and an animal's head so that the focal point is within the animal's brain.

10. The system of claim 9, wherein the generated electromagnetic radiation is within the radio frequency range.

11. The system of claim 9, wherein the generating electromagnetic radiation is within the microwave frequency range.

12. A stunning station comprising:

a holding compartment configured and arranged to hold an animal to be slaughtered;

a first waveguide configured to direct a first portion of electromagnetic radiation to a first side of a head of the animal; and a second waveguide configured to direct a second portion of electromagnetic radiation to a second side of the head of the animal such that the first portion of electromagnetic radiation and the second portion of electromagnetic radiation achieve constructive interference at a focal point within the animals head.

13. The stunning station of claim 12, further comprising:

a positioning member configured and arranged to position the animal's head between an output of the first waveguide and output of the second waveguide.

14. The stunning station of claim 13, further comprising:

an electromagnetic radiation generator configured to generate electromagnetic radiation at a select frequency; and a power splitter configured and arranged to split the generated electromagnetic radiation from the radiation generator into the first portion of electromagnetic radiation and the second portion of electromagnetic radiation.

15. The stunning station of claim 14, wherein the power slitter is configured and arranged to split the electromagnetic radiation so that the first portion of electromagnetic radiation and the second portion of electromagnetic radiation are in phase.

16. The stunning station of claim 15, wherein the first and second waveguides are positioned to direct the respective first portion of electromagnetic radiation and the second portion of electromagnetic radiation to the focal point where the constructive interference take place.

17. The stunning station of claim 14, further comprising:

the electromagnetic radiation generator configured to generate radio frequency electromagnetic radiation.

18. The stunning station of claim 14, further comprising:

the electromagnetic radiation generator configured to generate microwave frequency electromagnetic radiation.

* * * * *